(12) United States Patent
Boggess et al.

(10) Patent No.: US 7,861,818 B2
(45) Date of Patent: Jan. 4, 2011

(54) RESTRAINT SYSTEM FOR A HOOD LIFT DEVICE

(75) Inventors: Brian Boggess, Dublin, OH (US); Eric M. Hejtkamp, Columbus, OH (US); Gregory Joseph Mast, Columbus, OH (US); Ryan A. Miller, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/758,302

(22) Filed: Apr. 12, 2010

(65) Prior Publication Data

US 2010/0193277 A1 Aug. 5, 2010

Related U.S. Application Data

(63) Continuation of application No. 12/119,850, filed on May 13, 2008, now Pat. No. 7,730,990.

(51) Int. Cl.
B60K 28/10 (2006.01)
(52) U.S. Cl. ..................................... 180/274
(58) Field of Classification Search ................. 180/271, 180/274, 69.2, 69.21; 293/133; 296/187.04, 296/193.11; B60R 21/34
See application file for complete search history.

(56) References Cited

U.S. PATENT DOCUMENTS

| 4,012,807 | A | 3/1977 | Kern |
|---|---|---|---|
| 6,345,679 | B1 | 2/2002 | Sasaki |
| 6,439,330 | B1 | 8/2002 | Paye |
| 6,543,086 | B2 | 4/2003 | Bjureblad et al. |
| 7,073,846 | B2 | 7/2006 | Borg et al. |
| 7,077,225 | B2 | 7/2006 | Minami |
| 2005/0179286 | A1 | 8/2005 | Adachi |
| 2005/0206199 | A1 | 9/2005 | Minami |
| 2005/0257980 | A1 | 11/2005 | Green et al. |
| 2005/0264036 | A1 | 12/2005 | Kramarczyk et al. |
| 2006/0108169 | A1 | 5/2006 | Borg et al. |
| 2006/0151221 | A1 | 7/2006 | Kalliske et al. |

FOREIGN PATENT DOCUMENTS

| DE | 10034523 | 1/2002 |
|---|---|---|
| DE | 10116717 | 10/2002 |
| EP | 1164072 | 12/2001 |

*Primary Examiner*—Faye M. Fleming
(74) *Attorney, Agent, or Firm*—Plumsea Law Group, LLC; Mark E. Duell

(57) ABSTRACT

A hood lift device with a restraint system is disclosed. The system can include a catching hole configured to constrain an actuator tip within a hood after the hood lift device is deployed. By engaging the hood lift device with a hood, the hood may be restrained from contacting a windshield.

20 Claims, 9 Drawing Sheets

RESTRAINT SYSTEM FOR A HOOD LIFT DEVICE

CROSS REFERENCE TO RELATED APPLICATION

This application is a continuation of Ser. No. 12/119,850, now U.S. Pat. No. 7,730,990, entitled "Restraint System for a Hood Lift Device", filed on May 13, 2008 and issued on Jun. 8, 2010, which is incorporated herein by reference in its entirety.

BACKGROUND OF THE INVENTION

1. Field of the Invention

The present invention relates to motor vehicles and in particular to a restraint system for a hood lift device.

2. Description of Related Art

Devices for lifting the rear of a hood during an impact have been previously disclosed. Borg et al. (U.S. Patent Number 2006/0108169) is directed to a mechanical absorption system for an active bonnet hinge. Borg teaches a device that raises a bonnet during an initial collision using an actuator and a blocking device that is intended to block the actuator in a given position. Borg intends to provide a device that allows for impact absorption in the opposite direction of the direction that the bonnet is lifted, once a pedestrian has collided with the hood.

Borg teaches a safety device, including an actuator, a link rod, a raising lug and a locking hook. The safety device is associated with a bonnet. During an impact, a pyrotechnic charge exerts a thrust on the hook to release the link rod, causing a piston of the actuator to extend, which further raises the bonnet. As the actuator extends, a snap ring occupies a groove. At this point, the piston is prevented from extending any further. Borg teaches that this first phase corresponds to a phase of arming the safety device. During a second phase, force is applied to the piston by a pedestrian impacting the bonnet. This impact causes the piston to retract and the snap ring forcibly enters a small-diameter upstream part of a cylindrical body. This second phase corresponds to a phase of absorbing shock.

Kramarczyk et al. (U.S. Patent Number 2005/0264036) is directed to a hood elevation system. Kramarczyk teaches a hood elevation system for a motor vehicle, including an actuator configured to move a portion of a hood between an elevated and a retracted position. The hood elevating system also includes a self-locking mechanism. Kramarczyk teaches that the self-locking mechanism enables repeated elevation and retraction of the hood.

Kramarczyk teaches a hood that is attached to a vehicle by hinges adjacent to a windshield. Each hinge is operatively connected to a hood deployment linkage. Kramarczyk teaches that deployment of the linkage may be further associated with a motor via a self-locking mechanism. Kramarczyk teaches that the motor functions as an actuator to selectively move the hood between a retracted position and an elevated position by selectively retracting and extending a member. Kramarczyk also teaches that the motor is controlled by a sensing system.

The prior art requires systems with actuators including provisions to lock the piston, thereby increasing the complexity of the actuator. There is a need in the art for a system that constrains the lifting movement of the hood without the need to introduce additional components into the actuator system.

SUMMARY OF THE INVENTION

A restraint system for a hood lift device is disclosed. Generally, this system can be used in connection with an engine of a motor vehicle. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In one aspect, the invention provides a motor vehicle, comprising: a hood comprising a hood skin and a hood frame; a hinge configured to attach the hood to a portion of the motor vehicle; an actuator including an actuator tip configured to lift a rear portion of the hood associated with the hinge; a catching hole of the hinge configured to receive the actuator tip; and where the actuator tip is disposed below the catching hole when the actuator is in a retracted position and wherein the actuator tip is disposed through the catching hole when the actuator is in an extended position.

In another aspect, the hinge includes a lower portion and an upper portion.

In another aspect, the upper portion is a reinforcing portion.

In another aspect, the upper portion is disposed between the hood frame and the hood skin.

In another aspect, the hood frame includes a hole that is aligned with the catching hole.

In another aspect, the upper portion includes a reaction surface configured to engage the actuator tip.

In another aspect, a motor vehicle, comprising: a hood comprising a hood skin and a hood frame; a hinge configured to attach the hood to a portion of the motor vehicle; the hinge comprising a lower portion and an upper portion, the upper portion including a reaction surface disposed between the hood skin and the hood frame; an actuator including an actuator tip configured to lift a rear portion of the hood associated with the hinge; a catching hole of the hinge configured to receive the actuator tip; and where the actuator tip is configured to contact the reaction surface when the actuator is in an extended position.

In another aspect, the reaction surface is configured to deform when contacted by the actuator tip.

In another aspect, the hood is configured to slide towards the rear portion of the vehicle when the actuator tip engages the reaction surface.

In another aspect, the actuator tip is configured to fixedly engage with the catching hole after the hood slides rearwards.

In another aspect, the catching hole has a key-hole shape.

In another aspect, the hood frame is associated with a hole that is configured to deform around the actuator tip.

In another aspect, a motor vehicle, comprising: a hood attaching to the motor vehicle using a hinge; an actuator including an actuator tip configured to lift a rear portion of the hood associated with the hinge; the hinge comprising a lower portion including a catching hole configured to receive the actuator tip; a reaction surface disposed above the lower portion configured to contact the actuator tip in an extended position; and where the actuator tip is fixedly engaged with the catching hole in the extended position.

In another aspect, the hood is configured to slide towards a rear portion of the motor vehicle when the actuator tip is in the extended position.

In another aspect, the engagement of actuator tip with the catching hole prevents the rear portion of the hood from rotating during a collision.

In another aspect, the reaction surface deforms when contacted by the actuator tip.

In another aspect, the reaction surface is disposed on an upper portion of the hinge.

In another aspect, the reaction surface is sloped.

In another aspect, the hinge is associated with a catching device disposed beneath the lower portion of the hinge.

In another aspect, the catching device is configured to engage with the actuator tip.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
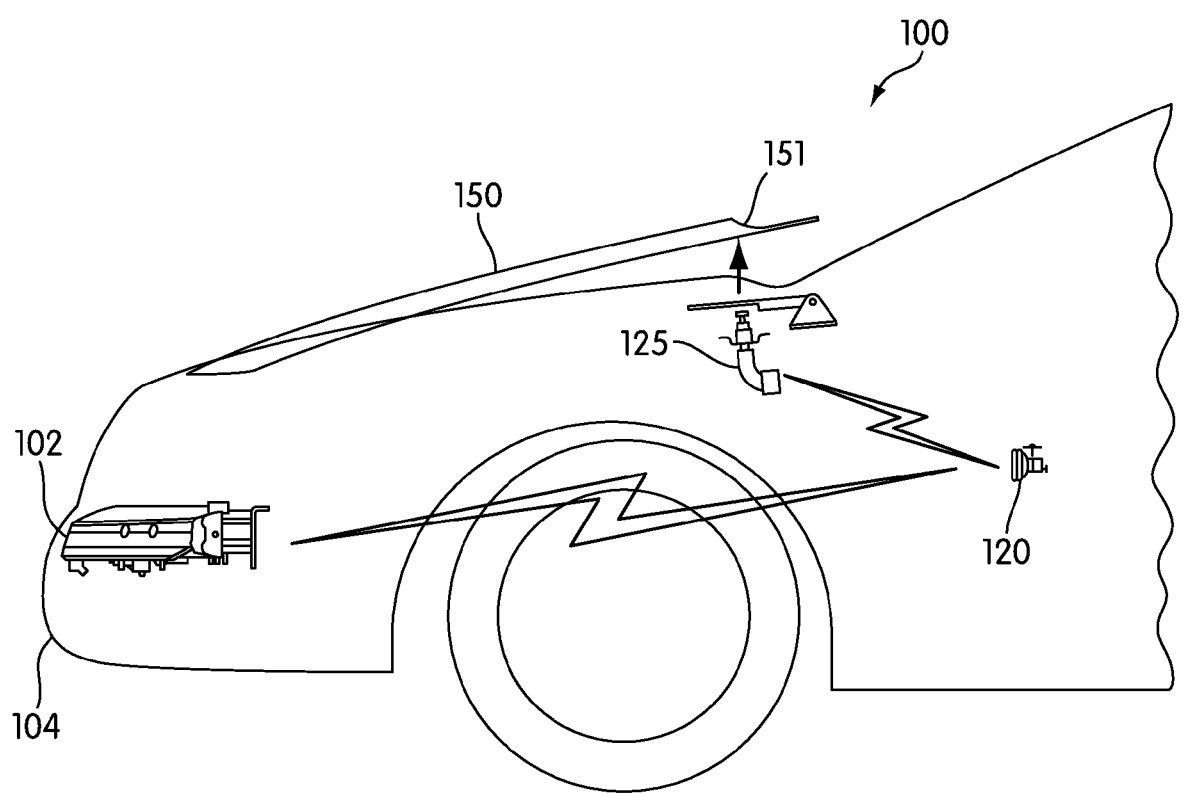
FIG. 1 is a side view of a preferred embodiment of a front portion of a motor vehicle with a hood lift device.

FIG. 1 is a side view of a preferred embodiment of a portion of motor vehicle 100. Generally, motor vehicle 100 could be any type of motor vehicle, including, but not limited to, cars, trucks, vans, minivans, SUVs, motorcycles, scooters, boats, personal watercraft, and aircraft.

Preferably, a motor vehicle may be configured with one or more sensors configured to detect various types of collisions. In the current embodiment, motor vehicle 100 may be associated with sensor 102. Preferably, sensor 102 is a pre-crash sensor configured to detect a potential collision. Generally, sensor 102 may be any type of pre-crash sensor, including, but not limited to, pressure sensors, radar, optical, fiber-optic, or infrared sensors. In some cases, sensor 102 may be part of a network of sensors disposed on the periphery of a motor vehicle. In other cases, sensor 102 may be part of a network of sensors including a vehicle speed sensor. In this preferred embodiment, sensor 102 is a radar sensor housed within front bumper 104 of motor vehicle 100. Using this arrangement, sensor 102 may detect a potential collision at the front of motor vehicle 100.

In some embodiments, a pre-crash sensor may alert a driver to a potential collision. In other embodiments, a pre-crash sensor may deploy motor vehicle systems to reduce the severity of a collision. In some cases, a pre-crash sensor may deploy air bags around the bumper or windshield wipers of a motor vehicle. In a preferred embodiment, a pre-crash sensor may signal a hood lift device to lift the hood into a position that adds crush space between the hood and engine to reduce the risk of pedestrian injuries to the head and chest. The term "hood lift device" as used throughout this detailed description and in the claims refers to the components of a system configured to lift a hood of a motor vehicle prior to a collision in order to provide added engine compartment clearance for collisions with a pedestrian.

In this embodiment, sensor 102 may be associated with hood lift device 125. In some embodiments, hood lift device 125 may be disposed below a side portion of hood 150. In other embodiments, hood lift device 125 may be disposed below a front portion of hood 150. In a preferred embodiment, hood lift device 125 may be disposed below rear portion 151 of hood 150. Details of hood lift device 125 will be discussed later in this detailed description.

In some embodiments, sensor 102 may signal hood lift device 125 to deploy prior to a collision. In a preferred embodiment, sensor 102 may signal electronic control unit (ECU) 120 of an imminent collision. ECU 120 then preferably signals hood lift device 125 to deploy. In some cases, ECU 120 may deploy additional systems to reduce the severity of a collision.

Generally, sensor 102, hood lift device 125 and ECU 120 may communicate in any manner. In some embodiments, components 102, 125 and 120 may communicate via one or more electrical wires or circuits. In other embodiments, components 102, 125 and 120 may communicate wirelessly. Although sensor 102 and hood lift device 125 communicate with ECU 120 in the current embodiment, in other embodiments, sensor 102 and hood lift device 125 could also communicate with one another directly. In these other embodiments, sensor 102 could send a signal to activate hood lift device 125 directly, instead of via ECU 120.

Preferably, after hood lift device 125 receives a signal to deploy, hood lift device 125 preferably pushes rear portion 151 of hood 150 upwards. Generally, hood 150 may be raised by any height above the front of motor vehicle 100. In some embodiments, hood lift device 125 may push rear portion 151 upward more than 10 cm above motor vehicle 100. In other embodiments, hood lift device 125 may push rear portion 151 upward less than 10 cm above motor vehicle 100. In a preferred embodiment, hood lift device 125 may push rear portion 151 upward approximately 10 cm above motor vehicle 100. Generally, hood lift device 125 pushes rear portion 151 of hood 150 upward to a position that adds crush space between hood 150 and an engine and other hard components.

During a motor vehicle-to-pedestrian collision, a pedestrian may strike and deform hood 150. After deforming hood 150, a pedestrian may contact an engine and/or other hard components underneath hood 150. By adding engine compartment clearance between hood 150 and the engine, hood lift device 125 creates a buffer that may prevent a pedestrian from immediately impacting the engine or other components disposed directly beneath hood 150 when the pedestrian strikes hood 150.

Figure 2:
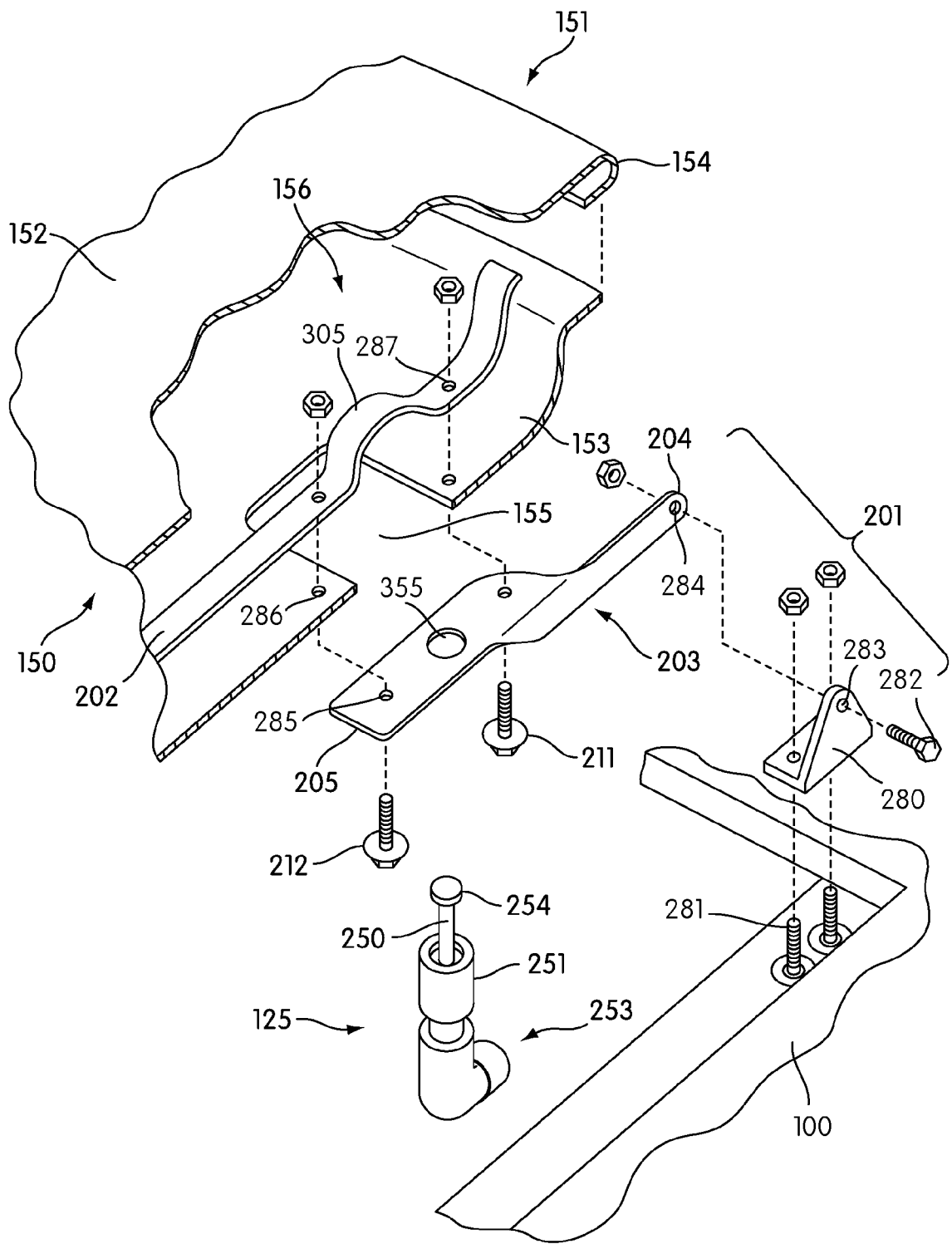
FIG. 2 is an isometric exploded view of a preferred embodiment of a hood, a hood hinge and a hood lift device.

FIG. 2 is an isometric exploded view of hood lift device 125 and hood 150. In the current embodiment, hood lift device 125 preferably includes actuator 253. Actuator 253 may be disposed within an engine compartment. Actuator 253 may be any type of actuator, including, but not limited to, pneumatic actuators, motors, and pyrotechnic actuators. In a preferred embodiment, actuator 253 may be a pyrotechnic actuator.

Actuator 253 may include rod 250. In this embodiment, rod 250 is a cylindrical rod. In other embodiments, rod 250 may have a different shape. In some embodiments, rod 250 may include actuator tip 254 at the top of rod 250. In some cases, actuator tip 254 may have a generally flattened shape and fit on top of rod 250. In other cases, actuator tip 254 may have a different shape. Further details of this arrangement are discussed later in this detailed description.

Preferably, actuator 253 includes provisions to house rod 250 when hood lift device 125 is not deployed. In this embodiment, cylinder 251 may be configured to house rod 250 prior to the firing of actuator 253. Although this embodiment of actuator 253 includes cylinder 251, rod 250, and actuator tip 254, in other embodiments, other components may be included in actuator 253. Additionally, in some other embodiments, some components discussed here may not be included. For example, in some cases, cylinder 251 may be optionally removed from actuator 253. Generally, actuator 253 may include any components configured to lift hood 150 to provide engine compartment clearance.

A cross section of hood 150 is illustrated in FIG. 2. In some cases, hood 150 may comprise hood skin 152 and hood frame 153. Preferably, hood skin 152 may provide a smooth continuous surface visible on the exterior of the motor vehicle. Also, hood frame 153 may be associated with the underside of hood 150. For purposes of clarity, only some components of hood 150 are illustrated in this Figure.

In some embodiments, a hood frame may be a frame with gaps. In other embodiments, a hood frame may have a multicone inner panel design. In still other embodiments, a hood frame may include a cavity. In some cases, a cavity within a hood frame may be configured with materials or structures for sound or energy absorption during a collision. In a preferred embodiment, a hood frame may include a cavity and at least one hole providing access to the cavity.

In the current embodiment, hood frame 153 may be disposed generally parallel to hood skin 152 before sloping upwards to join hood skin 152 at rearward edge 154. In other embodiments, hood frame 153 and hood skin 152 may have different shapes. Preferably, the shape of hood frame 153 is configured to form cavity 156. In this embodiment, cavity 156 includes the space between hood skin 152 and hood frame 153.

In this preferred embodiment, hood frame 153 may include hole 155. Hole 155 preferably provides access to cavity 156. In the current embodiment, hole 155 has a rectangular shape. In other embodiments, hole 155 could have a different shape. Generally, the shape and size of hole 155 could vary. Furthermore, in other embodiments, hood frame 153 may be associated with additional holes.

Preferably, a hood includes provisions to securely attach to a motor vehicle. Additionally, a hood may be configured to open and close to provide access to an engine compartment within a motor vehicle. In some embodiments, a hood may pivot at a lateral edge of the engine compartment to open and provide access to the engine compartment. In other embodiments, a hood may pivot at a forward edge of the engine compartment to open and provide access to the engine compartment. In a preferred embodiment, a hood hinge may secure a hood to a motor vehicle at a rearward edge of the engine compartment and allow a hood to pivot open to provide access to an engine compartment.

In this embodiment, hood 150 may be associated with hood hinge 201. Generally, hood hinge 201 may be any type of hinge including, but not limited to, detachable hood hinges, geared hood hinges, hinges with gas shocks and other types of hinges. Generally, hood hinge 201 is configured to connect hood 150 to motor vehicle 100, as well as to allow hood 150 to open and close. In some embodiments, hood hinge 201 may be disposed near rearward edge 154 of hood 150. In other embodiments, hood hinge 201 may be disposed in another location proximate to hood 150.

Preferably, hood hinge 201 comprises pivot portion 280 and lower portion 203. In this embodiment, pivot portion 280 may be configured to attach directly to motor vehicle 100. Likewise, lower portion 203 may be configured to attach to, and pivot with respect to, pivot portion 280. Furthermore, lower portion 203 may also be configured to connect with hood 150. Using this arrangement, hood hinge 201 may allow hood 150 to connect to, and pivot with respect to, motor vehicle 100.

In some embodiments, a hood hinge may include additional provisions to secure the hood hinge to a hood. In some cases, the hood hinge may be reinforced to prevent a fracture during a collision. In other embodiments, a lower portion of a hood hinge may be reinforced where the hood hinge fastens to a hood. In a preferred embodiment, a hood hinge may include additional portions to fasten the hood hinge to a hood.

In the current embodiment, hood hinge 201 further includes upper portion 202. Upper portion 202 may be disposed within cavity 156 of hood 150 to reinforce the attachment of hood hinge 201 to hood 150. Preferably, upper portion 202 is configured to attach to hood frame 153 and lower portion 203. This arrangement preferably strengthens the connection between lower portion 203 and hood 150.

Generally, portions 202, 203 and 280 of hood hinge 201 may be made of any material. In some embodiments, portions 202, 203 and 280 may be made of similar materials. In other embodiments, portions 202, 203 and 280 may be made of different materials. Portions 202, 203 and 280 are preferably made of substantially durable materials. In a preferred embodiment, portions 202, 203 and 280 may be made of a metal material or a metallic alloy.

Figure 3:
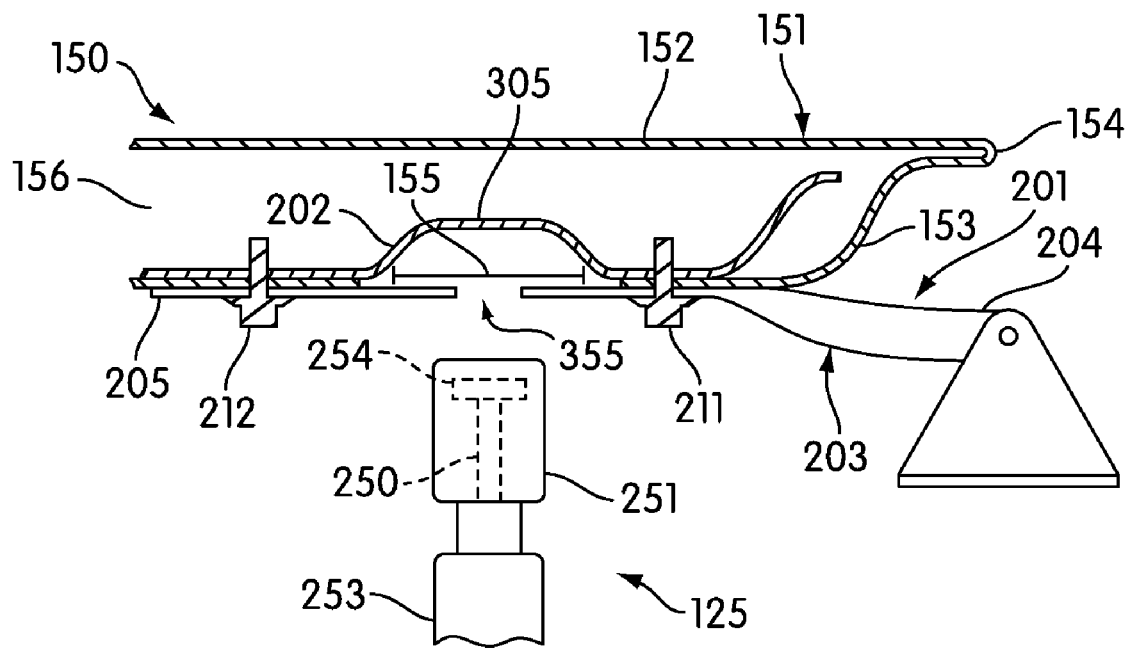
FIG. 3 is an assembled side view of a preferred embodiment of a hood, a hood hinge and a hood lift device.

FIGS. 2-3 illustrate a preferred embodiment of the assembly of hood hinge 201 with hood 150 and motor vehicle 100. Initially, upper portion 202 of hood hinge 201 may be inserted into cavity 156 of hood 150. Following this, first mounting holes 285 of lower portion 203 may be aligned with second mounting holes 286 of hood frame 153. Additionally, third mounting holes 287 of upper portion 202 may also be aligned with mounting holes 285 and 286. At this point, first bolt 211 and second bolt 212 may be inserted through mounting holes 285, 286 and 287 to secure lower portion 203 and upper portion 202 to hood 150. Using this arrangement, hood frame 153 may be sandwiched between lower portion 203 and upper portion 202, strengthening the connection between hood hinge 201 and hood 150.

Although the current embodiment uses two bolts to secure lower portion 203 and upper portion 202 to hood 150, in other embodiments any number of bolts may be used. Additionally, in some other embodiments, one or more portions of hood hinge 201 may be welded directly to hood 150. Preferably, hood hinge 201 may be attached to hood 150 in a manner that does not prevent the lifting of hood 150 during a collision.

Preferably, pivot portion 280 may also be attached directly to motor vehicle 100. In this preferred embodiment, pivot portion 280 may be attached to motor vehicle 100 using bolts 281. In other embodiments, pivot portion 280 could be welded to motor vehicle 100 or attached using other provisions.

Preferably, lower portion 203 and pivot portion 280 may be attached to one another during the assembly of hood hinge 201. In particular, first pivot hole 283 of pivot portion 280 may be aligned with second pivot hole 284 of lower portion 203. Following this, pivot bolt 282 may be inserted through holes 283 and 284 in order to fasten lower portion 203 to pivot portion 280. This connection preferably facilitates the pivoting of lower portion 203 with respect to pivot portion 280 and motor vehicle 100.

Preferably, a hinge may be associated with provisions for restraining or catching a portion of an actuator. In some embodiments, the hinge may be associated with a restraint system. The term "restraint system" as used throughout this detailed description and in the claims refers to any components, mechanisms or devices for constraining one or more components of a hood lift device. In some cases, the restraint system may include a catching hole. The catching hole may be configured to receive an actuator tip after a hood lift device deploys. In other cases, the restraint system could include another type of catching device that is configured to catch a portion of an actuator. By catching the actuator tip after the actuator tip pushes a hood upward, the actuator tip will be constrained within the hood. In particular, the actuator tip when trapped may cause the hood lift device to act as an anchor for a rear portion of the hood. With this arrangement, the rear portion of the hood may be anchored by the hood lift device prior to a collision.

Referring to FIGS. 2-3, lower portion 203 may include catching hole 355. In some embodiments, catching hole 355 may be aligned with a portion of actuator 253. In particular, catching hole 355 may be disposed just above actuator 253, as seen in FIG. 3. Furthermore, catching hole 355 may be disposed below hole 155. In a preferred embodiment, both catching hole 355 and hole 155 are configured to receive actuator tip 254 once hood lift device 125 has deployed.

Preferably, actuator tip 254 is configured to engage upper portion 202 of hood hinge 201 in order to apply a lifting force to hood 150. In this embodiment, upper portion 202 may include reaction surface 305. Preferably, actuator tip 254 may strike reaction surface 305 when hood lift device 125 is deployed. In some embodiments, reaction surface 305 of upper portion 202 may be shaped in a curve that arches over hole 155. With this shape, upper portion 202 may be configured so as not to block hole 155. Using this arrangement, actuator tip 254 may lift hood 150 to create engine compartment clearance during a collision by striking reaction surface 305.

Figure 4:
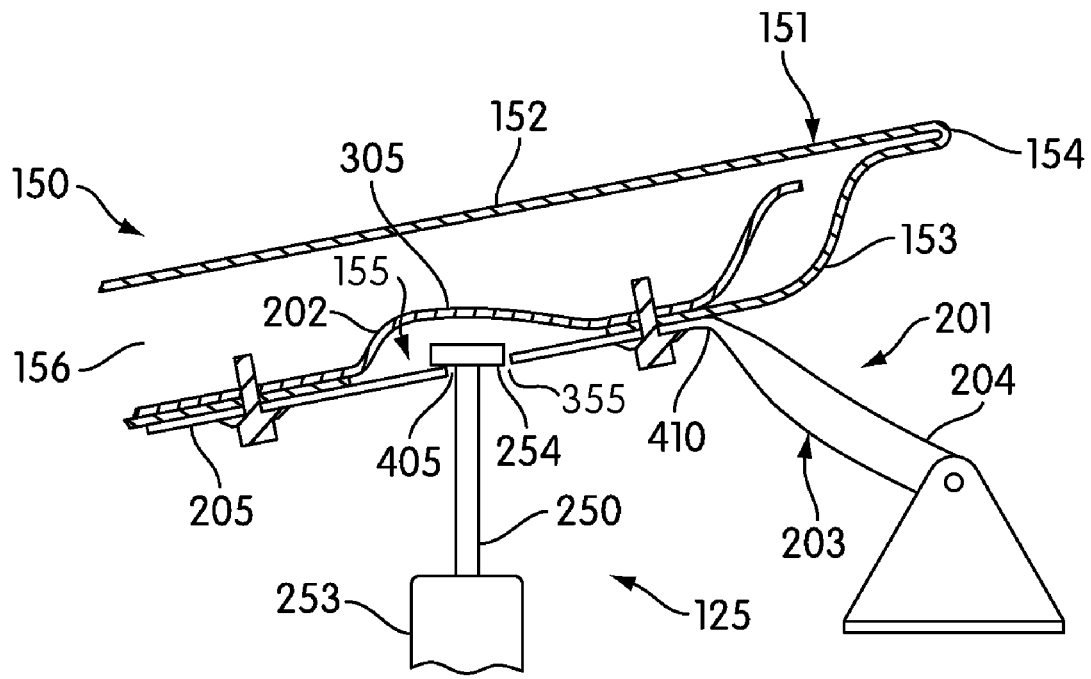
FIG. 4 is an assembled side view of a preferred embodiment of a deployed hood lift device.

Prior to a collision, actuator 253 may be disposed in a retracted position, as seen in FIG. 3. In this position, rod 250 and actuator tip 254 are retracted within cylinder 251. In particular, in this retracted position, actuator tip 254 is disposed below catching hole 355. However, following a collision, actuator 253 may be disposed in an extended position, as seen in FIG. 4. In this position, rod 250 and actuator tip 254 may be extended outwards from cylinder 251 and preferably engage one or more portions of hinge 201 and hood 150. In particular, in this extended position, actuator tip 254 may be inserted through catching hole 355 and may engage with reaction surface 305.

Referring to FIG. 4, hood lift device 125 is deployed for an imminent collision. In this embodiment, actuator 253 lifts rod 250 upwards with an explosive charge. Rod 250 pushes through holes 155 and 355 to strike reaction surface 305 of hood hinge 201. Preferably, rod 250 strikes reaction surface 305 with actuator tip 254. The relatively large surface area of actuator tip 254 may reduce local pressure when actuator tip 254 pushes against reaction surface 305. With this arrangement, actuator tip 254 deforms upper portion 202 as actuator tip 254 strikes reaction surface 305 instead of potentially puncturing reaction surface 305.

As upper portion 202 deforms, lower portion 203 may also be deformed because lower portion 203 is bolted to upper portion 202. In some embodiments, lower portion 203 may be configured to deform at bend point 410. This deformation at bend point 410 releases some of the pressure exerted by hood hinge 201 on hood 150. Through the force of actuator tip 254 striking reaction surface 305 on hood hinge 201, hood 150 is forced upward to provide crush space for a potential pedestrian striking hood 150.

As hood 150 is pushed upwards, hood 150 may also slide rearward toward a rear portion of the motor vehicle. Likewise, hood hinge 201 will also slide rearward. When hood hinge 201 slides rearward actuator tip 254 will become misaligned with catching hole 355. Preferably, this causes actuator tip 254 to be locked within hood frame 153. In particular, pressure from edge 405 of catching hole 355 will force rod 250 and actuator tip 254 to remain within cavity 156. Additionally, the broad flat shape of actuator tip 254 may assist in keeping rod 250 within cavity 156. With this arrangement, rod 250 will be prevented from falling downward after the force from actuator 253 is depleted. In other words, actuator tip 254 and hood hinge 201 may be fixedly engaged when actuator 253 is in this fully extended position.

While rod 250 is pressed against edge 405 of catching hole 355, rod 250 will preferably stop hood 150 from sliding further in the rearward direction. By stopping hood 150 from sliding further rearward, rod 250 may prevent hood 150 from impacting a windshield and potentially causing injury to a driver or a passenger.

In prior designs, hood lift devices may increase the likelihood of a hood impacting a windshield during a collision. As previously discussed, when a hood lift device deploys prior to the collision, the rear portion of the hood is pushed upwards. In a frontal collision, the hood may be configured to fold at a predefined weak point to absorb some of the force of the collision. In some cases, this combination of forces may cause the rearward edge of the hood to over rotate and impact the windshield. By pushing up a rear portion of a hood prior to a collision, a hood lift device may cause a hood to be pushed into a windshield when the hood is forced rearward during a frontal collision.

Figure 5:
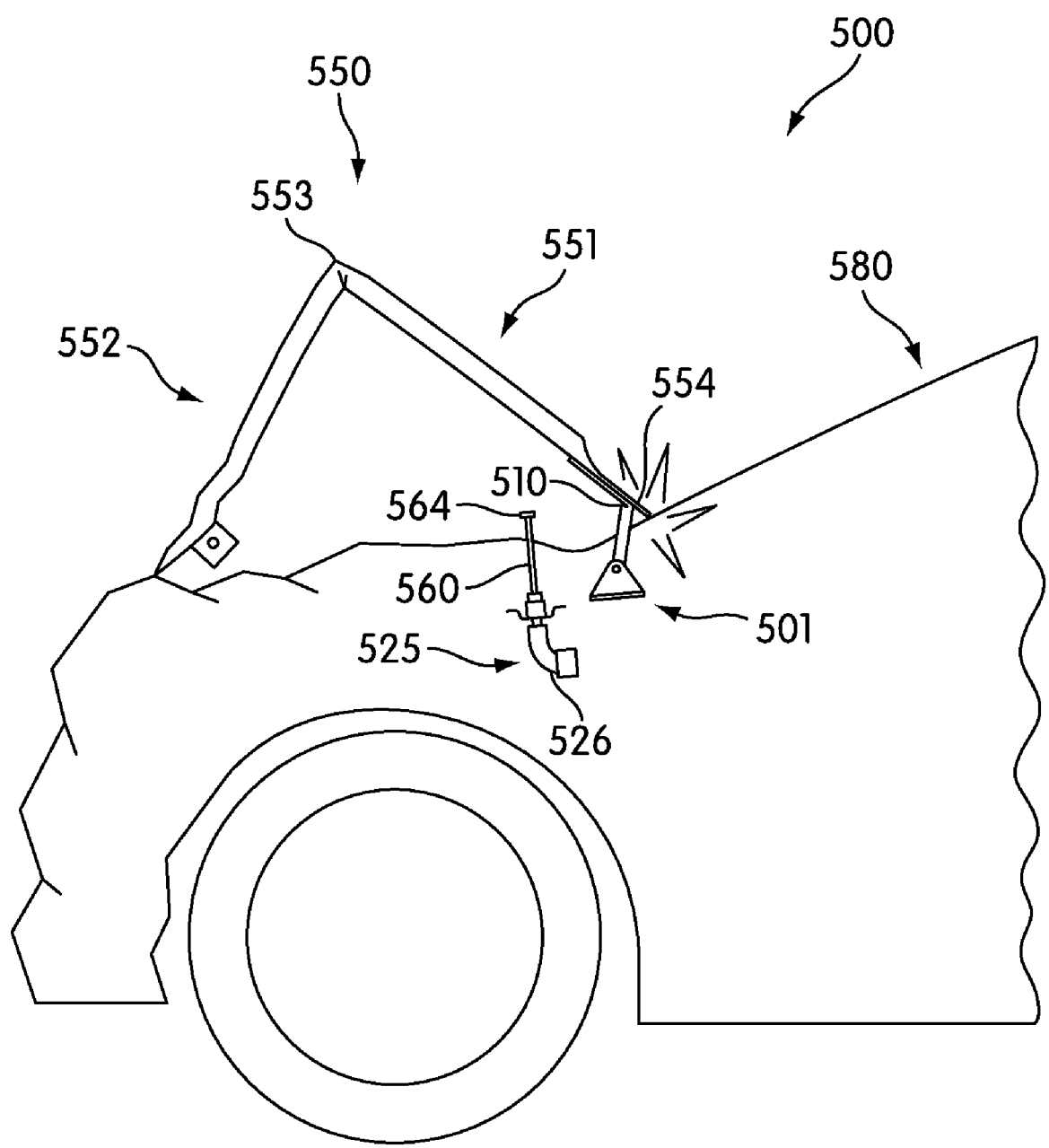
FIG. 5 is a side view of an exemplary embodiment of a front portion of a motor vehicle in a post-impact condition.

FIG. 5 illustrates a schematic view of an exemplary embodiment of a front portion of motor vehicle 500 in a post-impact condition. Preferably, motor vehicle 500 includes hood lift device 525. While hood lift device 525 is configured to deploy in a collision to protect a pedestrian, hood lift device 525 may also deploy in other collisions including motor vehicle-to-motor vehicle collisions. In the current embodiment, motor vehicle 500 collides with another motor vehicle, not shown in this Figure for purposes of clarity.

As motor vehicle 500 experiences a frontal collision with another motor vehicle, hood lift device 525 deploys when signaled of an imminent collision. In this embodiment, rod 560 strikes a portion of hood hinge 501 to push rear portion 551 of hood 550 upward. The force from rod 560 deforms hood hinge 501 at bend point 510. This causes rear portion 551 to be pushed upward.

In this embodiment, hood 550 and hood hinge 501 do not include a mechanism to catch actuator tip 564 after hood lift device 525 deploys. When the force of the charge from actuator 526 is depleted, rod 560 and hood hinge 501 are no longer engaged. Therefore, rear portion 551 is not engaged by hood lift device 525. With this configuration, deformed hood hinge 501 is the only point of attachment between rear portion 551 and motor vehicle 500.

As motor vehicle 500 collides with another motor vehicle, hood 550 folds to absorb some of the force of the collision. Specifically, front portion 552 and rear portion 551 are rotated upward at pre-defined weak point 553. Furthermore, the force of the collision pushes rear portion 551 rearward. Since hood lift device 525 raises rearward edge 554, rearward edge 554 is disposed higher on windshield 580. In some cases, the force of the collision may cause rearward edge 554 to impact windshield 580. With this combination of forces from hood lift device 525 and the collision, rearward edge 554 may be driven into windshield 580.

Figure 6:
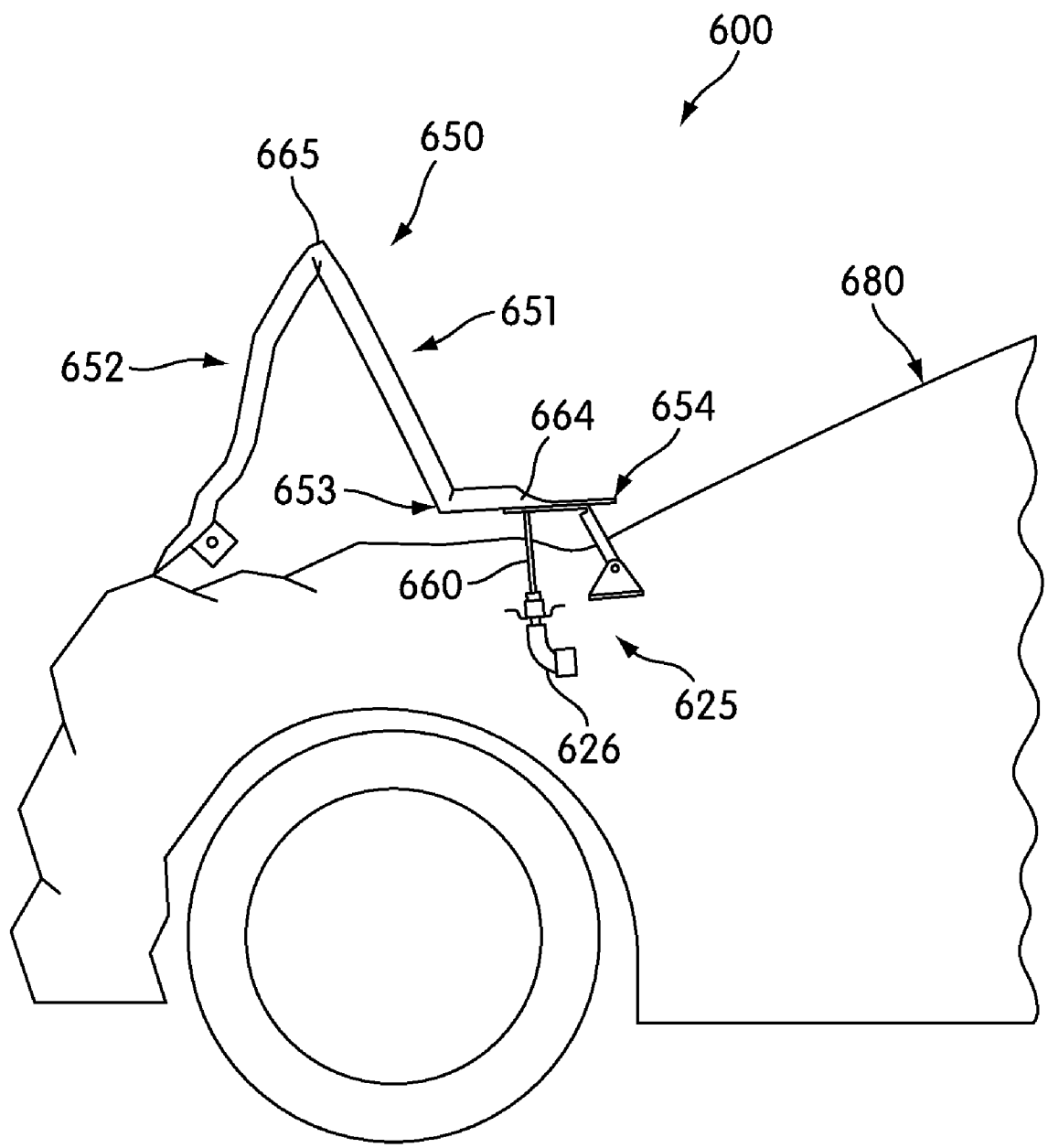
FIG. 6 is a side view of a preferred embodiment of a front portion of a motor vehicle in a post-impact condition.

Preferably, a hood lift device and a hood may be configured with provisions to protect not only pedestrians but also the occupants of a motor vehicle during a collision. FIG. 6 illustrates a preferred embodiment of a front portion of motor vehicle 600 after a frontal collision with another motor vehicle. For purposes of clarity, only hood 650 and hood lift device 625 are shown in FIG. 6.

Prior to the frontal collision, hood lift device 625 preferably deploys. As discussed previously, hood lift device 625 is deployed to protect pedestrians in motor vehicle-to-pedestrian collisions. However, in some cases, hood lift device 625 may also deploy in motor vehicle-to-motor vehicle collisions as well as collisions with other objects.

When hood lift device 625 deploys, actuator tip 664 is forced upward by actuator 626. At this point, rod 660 pushes rear portion 651 upward to provide crush space between hood 650 and an engine compartment. After the force of the charge from actuator 626 is depleted, actuator tip 664 does not disengage from hood 650 because actuator tip 664 is caught within hood frame 653. In particular, actuator tip 664 is fixedly engaged with a catching hole of a hood hinge as previously discussed. This configuration fixedly engages actuator tip 664 with hood frame 653 near rearward edge 654.

As hood 650 is struck by a frontal collision, hood 650 folds at pre-defined weak point 665. Front portion 652 and rear portion 651 are forced upward when hood 650 folds at pre-defined weak point 665. Furthermore, hood 650 and specifically rearward edge 654 may be pushed rearward by the collision. In this embodiment, however, hood lift device 625 is locked in place on hood frame 653. This arrangement prevents rear portion 651 from moving rearward. Rear portion 651 is instead forced to bend between pre-defined weak point 665 and rearward edge 654 to accommodate the force of the collision. In other words, as hood 650 folds rearward edge 654 is locked into place by actuator tip 664 of hood lift device 625. With this configuration, rearward edge 654 is substantially prevented from impacting windshield 680 and potentially harming vehicle occupants.

Preferably, the shape of a catching hole in a lower portion of a hood hinge is configured to securely engage an actuator tip after a hood lift device deploys. This arrangement ensures that a rear portion of a hood is anchored by the actuator tip during a collision and prevented from moving rearward into a windshield. Generally, a catching hole may have any shape configured to catch an actuator tip after a hood lift device deploys. Examples of different shapes for a catching hole include, but are not limited to, keyhole shapes, star shapes, rectangular shapes, polygonal shapes, irregular shapes, as well as other shapes.

Figure 7:
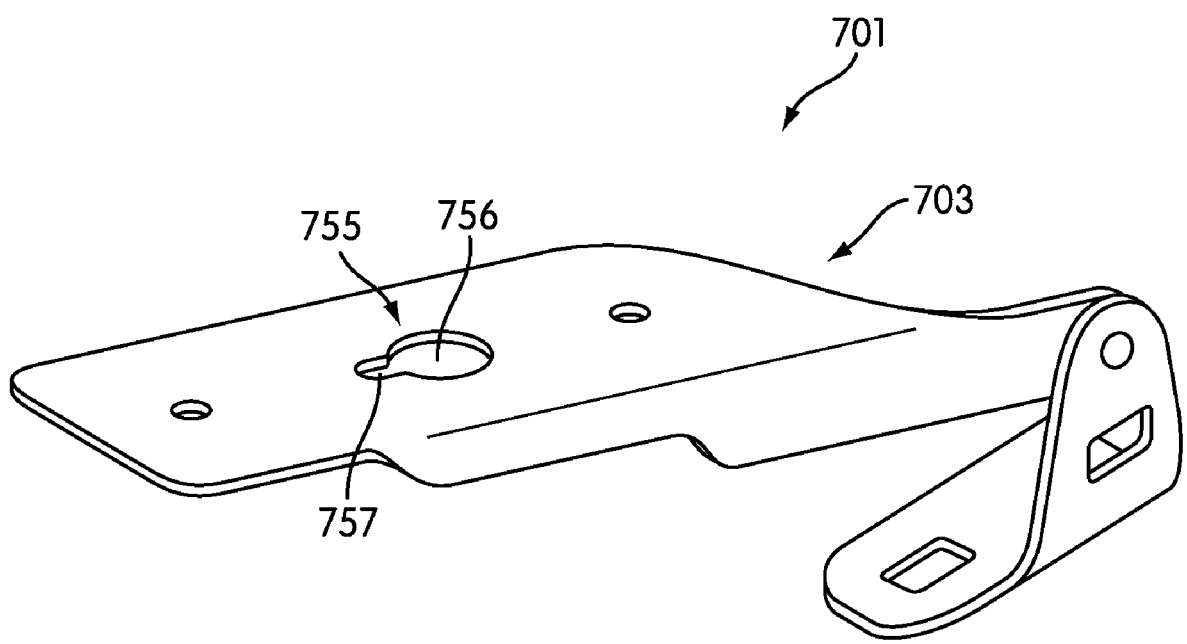
FIG. 7 is an isometric view of a preferred embodiment of a lower portion of a hood hinge with a keyhole shaped catching hole.

FIG. 7 illustrates an alternative embodiment of catching hole 755 in lower portion 703 of hood hinge 701. In this alternative embodiment, catching hole 755 may have a keyhole-like shape. The keyhole shape of catching hole 755 may include circular portion 756. Preferably, circular portion 756 is configured to allow an actuator tip to pass through circular portion 756 of catching hole 755 when a hood lift device deploys.

Furthermore, catching hole 755 includes provisions to catch an actuator tip when a hood slides rearward in a collision. In the current embodiment, catching hole 755 may be configured with key portion 757 to catch an actuator tip. As the hood slides rearward during a frontal collision, catching hole 755 will slide rearward. Key portion 757 will be pushed against a rod and catch the actuator tip. This arrangement secures the actuator tip within a hood frame and keeps the hood from sliding further rearward and impacting a windshield.

In still other embodiments, a portion of a hood frame configured to receive an actuator tip may be fabricated out of a weak material, such as sheet metal, that may be deformed as a hood lift device pushes through a catching hole. In other words, a hole associated with the hood frame may be shaped without the clearance to allow an actuator tip to pass through. Instead, an actuator tip may deform the edges of the hole as it passes through. By deforming the edges of the hole, the actuator tip may create resistance when the actuator tip attempts to separate from the hood. This configuration causes the actuator tip to be caught when the force of the actuator is extinguished.

Figure 8:
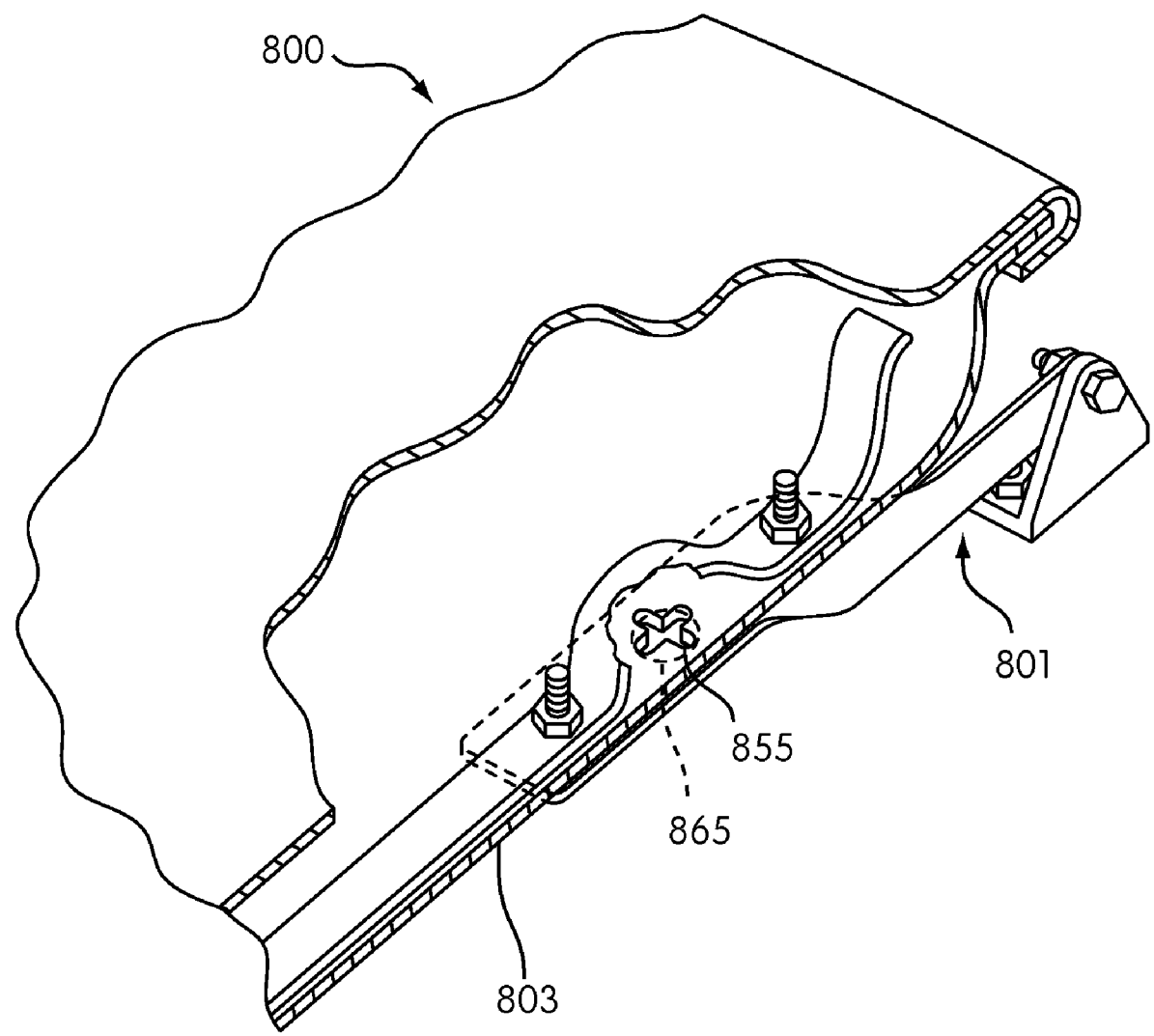
FIG. 8 is an isometric view of a preferred embodiment of a lower portion of a hood hinge with a star shaped catching hole.

FIG. 8 illustrates an alternative embodiment of hole 855 disposed within hood frame 803 of hood 800. In the current embodiment, the material in the portion of hood frame 803 that includes hole 855 may be relatively weak. In some cases, the material may be sheet metal. In other cases, the material may be some other type of metal alloy with little resistance. With this configuration, hole 855 may be shaped so that an actuator tip may not pass through hole 855 without deforming the edges of hole 855.

Preferably, the deformation of the edges of hole 855 causes an actuator tip to be caught when rod attempts to fall after the force of the actuator is dissipated. Instead of falling through hole 855 and then through catching hole 856 of hood hinge 801, the actuator tip remains within hood frame 803. Using this arrangement, the actuator tip may be caught within hood frame 803 by hole 855 prior to any rearward movement of a hood.

As previously discussed, an actuator tip may strike a reaction surface of an upper portion of a hood hinge. In other embodiments, a reaction surface may be a portion of a hood skin. In still other embodiments, a reaction surface may be a portion of a hood frame. Generally, a reaction surface may be associated with any component fabricated with a material of sufficient strength to raise a hood following a strike from a hood lift device.

Figure 9:
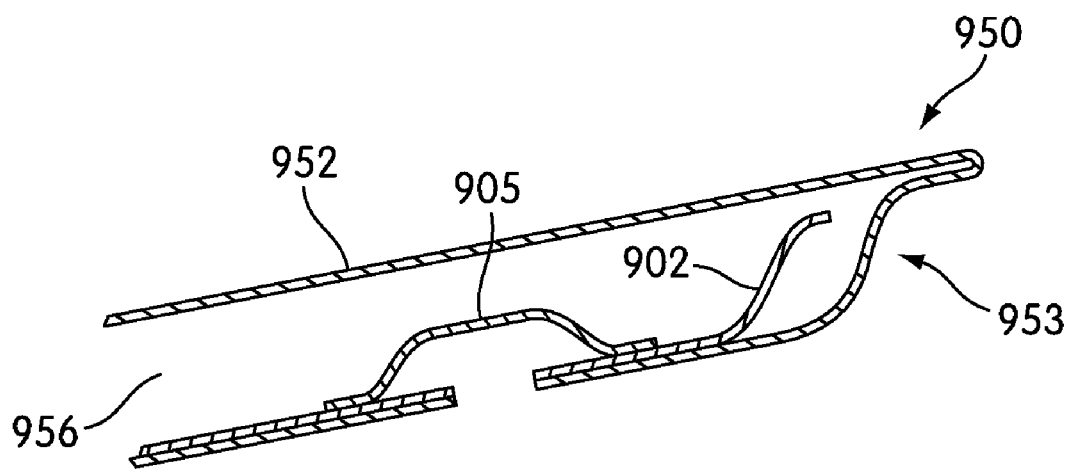
FIG. 9 is side view of an alternative embodiment of an upper portion of a hood hinge and a reaction surface.

In an alternative embodiment illustrated in FIG. 9, reaction surface 905 may be an individual component disposed within hood frame 953. In other embodiments, reaction surface 905 may be disposed below a hood frame or in another location proximate to a hood lift device. In the current embodiment, reaction surface 905 is secured within cavity 956 by upper portion 902 of a hood hinge.

This arrangement of a separate component for reaction surface 905 may facilitate the use of a specific material or shape for reaction surface 905. In some cases, reaction surface 905 may be made of a stiffer material than the materials used for hood frame 953, hood skin 952 and upper portion 902 of a hood hinge. In other cases, reaction surface 905 may be made of the same material as the material used for a hood frame 953 or upper portion 902 of a hood hinge. In a preferred embodiment, reaction surface 905 may be fabricated with a material stiffer than the material used for upper portion 902. Using this configuration, reaction surface 905 may force hood 950 upward when struck by components of a hood lift device.

In some embodiments, a reaction surface may be shaped to aid in engaging an actuator tip after deployment of a hood lift device. In previous embodiments, the reaction surface is generally symmetrical. In an alternative embodiment, the shape of the reaction surface may be sloped to assist in the constraint of an actuator tip.

Figure 10:
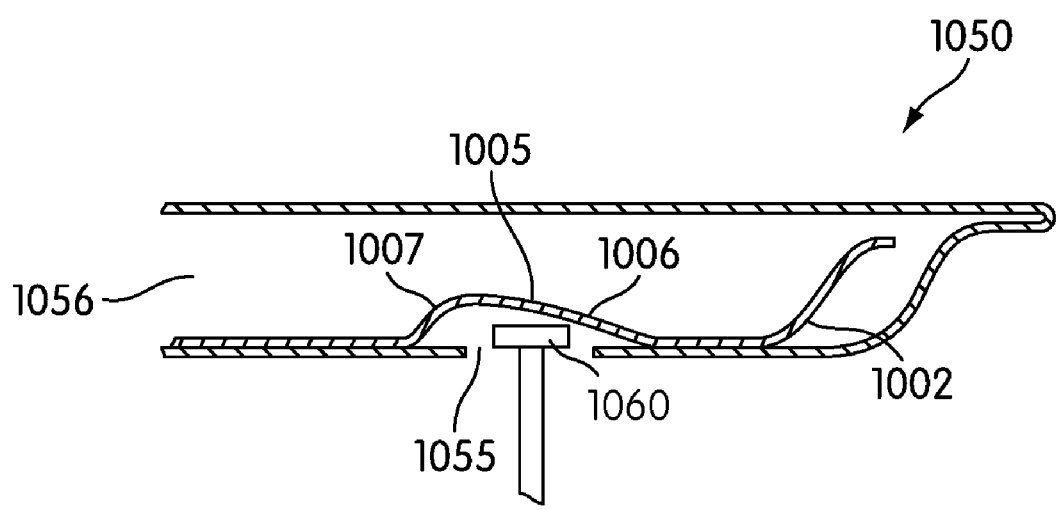
FIG. 10 is a side view of an alternative embodiment of an upper portion of a hood hinge with a sloped reaction surface.

Referring to FIG. 10, reaction surface 1005 is configured with a steeper slope on forward portion 1007 than rear portion 1006. When a hood lift device executes, this difference in slopes preferably directs an actuator tip in a forward direction relative to hood 1050. This configuration assists in the capture of actuator tip 1060 by misaligning actuator tip 1060 with catching hole 1055 as actuator tip 1060 is pushed forward and hood 1050 is pushed rearward.

In the current embodiment, reaction surface 1005 is disposed on upper portion 1002 of a hood hinge within cavity 1056. However, in other embodiments, reaction surface 1005 may be a separate component. In still other embodiments, reaction surface 1005 may be disposed on a hood frame or hood skin. Generally, reaction surface 1005 may be disposed in any location that is configured to lift a hood when a hood lift device is deployed. Furthermore, in some embodiments, reaction surface 1005 may be any shape that assists in the constraint of an actuator tip after the force from an actuator is dissipated.

In previous embodiments, an actuator tip is associated with a catching hole. In an alternative embodiment, an actuator tip may be caught by a catching device that is disposed below a lower portion of a hinge. Generally, the catching device may be any shape that fixedly engages an actuator tip with a hinge after the force from an actuator is depleted. In some embodiments, the catching device may be a portion of a hood frame. In other embodiments, the catching device may be a portion of a hood frame. In a preferred embodiment, a catching device may be a standalone component.

Figure 11:
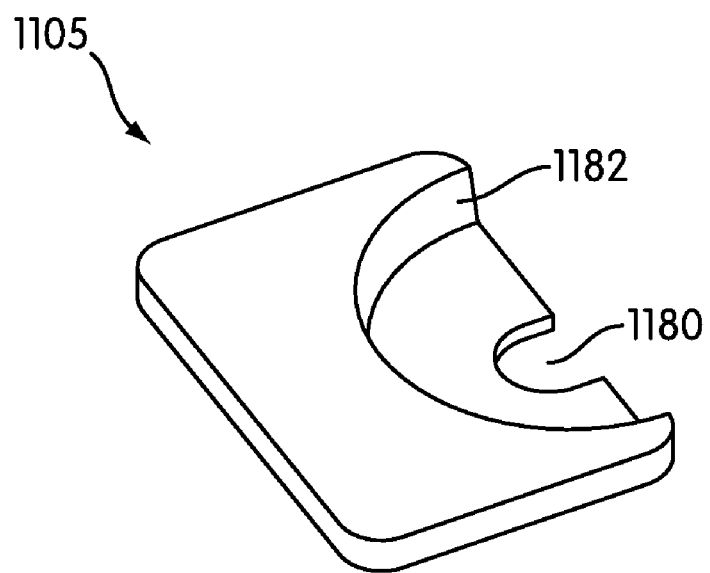
FIG. 11 is an isometric view of an alternative embodiment of a lower portion of a hood hinge with a catching device.
Figure 12:
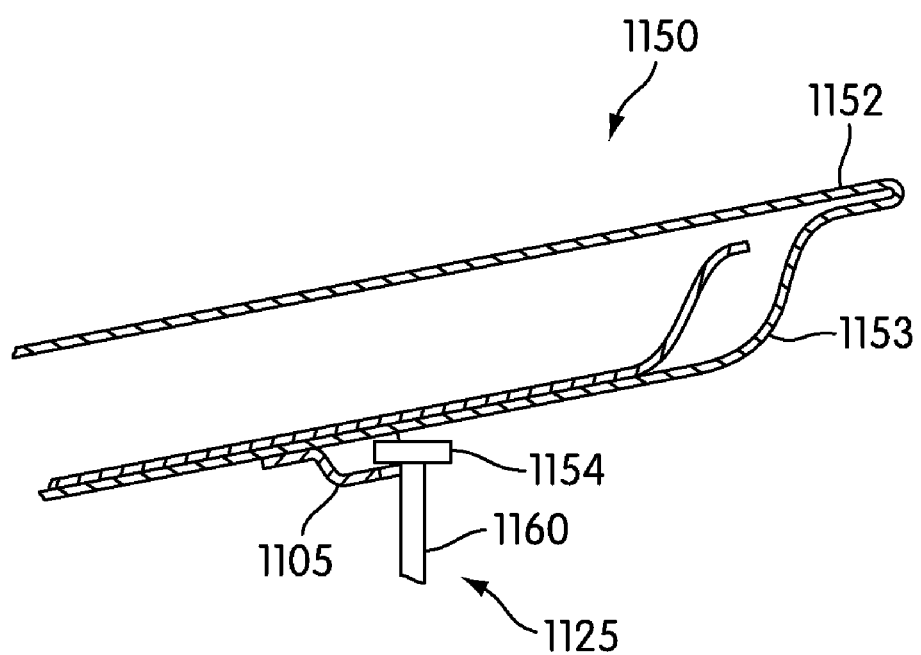
FIG. 12 is a cross sectional view of a preferred embodiment of a lower portion of a hood hinge with a catching device.

FIGS. 11-12 illustrate an alternative embodiment of catching device 1105 engaging actuator tip 1154. In this embodiment, catching device 1105 is preferably disposed below hood frame 1153 and attached to hood frame 1153 by bolts or some other means of attachment. Particularly, catching device 1105 may be disposed in a forward direction of catching device 1105 and in such a manner that catching device 1105 does not initially engage actuator tip 1154 as hood lift device 1125 deploys, prior to actuator tip 1154 contacting hood frame 1153.

Referring to FIG. 11, catching device 1105 may include small hole 1180 and indentation 1182. Preferably, small hole 1180 may be shaped to engage rod 1160. Additionally, indentation 1182 may be shaped to engage actuator tip 1154. Generally, catching device 1105 may be configured with any shape that may engage rod 1160 and/or actuator tip 1154.

After hood lift device 1125 deploys, rear portion 1152 of hood 1150 is raised approximately 10 cm as actuator tip 1154 engages hood frame 1153. This causes catching device 1105 to move upward at an angle. This movement may cause catching device 1105 to engage rod 1160 and actuator tip 1154. Furthermore, as a collision ensues, hood 1150 will be pushed rearward causing catching device 1105 to be pushed into rod 1160 and actuator tip 1154. With this configuration, actuator tip 1154 is restrained from falling when the force from the actuator is depleted. After a hood lift device 1125 raises hood 1150, hood 1150 may be prevented from impacting a windshield during a frontal collision by constraining rod 1160 and actuator tip 1154 within catching device 1105.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A motor vehicle, comprising:
   a hood comprising a hood skin and a hood frame;
   a hinge configured to attach the hood to a portion of the motor vehicle;
   an actuator including an actuator tip configured to lift a rear portion of the hood associated with the hinge;
   a catching hole of the hinge configured to receive the actuator tip;
   wherein the actuator tip is disposed below the catching hole when the actuator is in a retracted position and wherein the actuator tip is disposed through the catching hole when the actuator is in an extended position;
   wherein the hood frame includes a first portion disposed over the catching hole; and
   wherein the first portion comprises a first material configured to deform when the actuator is disposed through the catching hole.

2. The motor vehicle according to claim 1, further including a reaction surface configured to engage the actuator tip.

3. The motor vehicle according to claim 2, wherein the reaction surface comprises an upper portion of the hinge.

4. The motor vehicle according to claim 2, wherein the reaction surface comprises the first portion of the hood frame.

5. The motor vehicle according to claim 1, wherein the hood frame comprises a second material; and
   wherein the first material is weaker than the second material.

6. The motor vehicle according to claim 1, wherein the first portion comprises a hole configured to engage at least a portion of the actuator tip when the actuator tip is disposed through the catching hole.

7. The motor vehicle according to claim 6, wherein the hole further comprises at least one edge configured to deform when the actuator tip is disposed through the catching hole.

8. A motor vehicle, comprising:
a hood comprising a hood skin and a hood frame;
a hinge configured to attach the hood to a portion of the motor vehicle;
the hinge comprising a lower portion and an upper portion, the upper portion disposed between the hood skin and the hood frame;
an actuator including an actuator tip configured to lift a rear portion of the hood associated with the hinge;
a catching hole of the hinge configured to receive the actuator tip;
a reaction surface configured to contact the actuator tip when the actuator is in an extended position; and
wherein the hood and the hinge comprise a first material, and the reaction surface comprises a second material, the second material having a greater stiffness than the first material.

9. The motor vehicle according to claim 8, wherein the reaction surface is disposed between the upper portion of the hinge and the hood skin.

10. The motor vehicle according to claim 8, wherein the reaction surface is disposed inside a cavity formed between the hood skin and the hood frame.

11. The motor vehicle according to claim 8, wherein the reaction surface is disposed on the upper portion of the hinge.

12. The motor vehicle according to claim 8, wherein the reaction surface is sloped.

13. The motor vehicle according to claim 8, wherein the hood is configured to slide towards a rear portion of the motor vehicle when the actuator is in the extended position.

14. A motor vehicle, comprising:
a hood comprising a hood skin and a hood frame;
the hood frame including a reaction surface;
an actuator configured to lift a rear portion of the hood;
the actuator comprising a rod and an actuator tip;
the actuator tip configured to contact the reaction surface when the actuator is in an extended position;
a catching device disposed below the hood frame, the catching device configured to engage a portion of the rod and a portion of the actuator tip when the actuator is in the extended position;
wherein the catching device is disposed in a forward direction of the actuator; and
wherein the catching device is configured to initially engage the portion of the rod and the portion of the actuator tip when the actuator is in the extended position and the hood slides towards a rear portion of the motor vehicle.

15. The motor vehicle according to claim 14, wherein the catching device is configured to move from the forward direction towards the actuator in the extended position as the hood slides towards the rear portion of the motor vehicle.

16. The motor vehicle according to claim 14, wherein the engagement of the portion of the rod and the portion of the actuator tip with the catching device prevents the rear portion of the hood from rotating during a collision.

17. The motor vehicle according to claim 14, wherein the catching device further comprises a small hole and an indentation.

18. The motor vehicle according to claim 17, wherein the small hole is shaped to engage the portion of the rod and the indentation is shaped to engage the portion of the actuator tip.

19. The motor vehicle according to claim 14, wherein the catching device is configured to engage the portion of the rod and the portion of the actuator tip after the actuator tip has contacted the reaction surface.

20. The motor vehicle according to claim 14, wherein the catching device is configured to move upwards at an angle from the forward position towards the actuator in the extended position after the actuator tip has contacted the reaction surface.

* * * * *

UNITED STATES PATENT AND TRADEMARK OFFICE
CERTIFICATE OF CORRECTION

| | | |
|---|---|---|
| PATENT NO. | : 7,861,818 B2 | |
| APPLICATION NO. | : 12/758302 | |
| DATED | : January 4, 2011 | |
| INVENTOR(S) | : Brian Boggess et al. | |

It is certified that error appears in the above-identified patent and that said Letters Patent is hereby corrected as shown below:

On the Ttitle Page, item (75) Inventors:

The second inventor's last name "Hejtkamp" is replaced with --Heitkamp--

Signed and Sealed this
Twenty-second Day of March, 2011

David J. Kappos
*Director of the United States Patent and Trademark Office*